Patented July 4, 1950

2,513,825

UNITED STATES PATENT OFFICE 2,513,825

PREPARATION OF KETENES

Ben E. Sorenson, Drexel Hill, Pa., assignor to E. I. du Pont de Nemours & Company, Wilmington, Del., a corporation of Delaware No Drawing. Application April 10, 1946, Serial No. 661,055

8 Claims. (Cl. 260—585.5)

This invention relates to a process of producing new and useful products from saturated and unsaturated higher aliphatic monocarboxylic acids and more particularly to a method of controlling the preparation of ketenes by heating long chain aliphatic monocarboxylic acids with acetic anhydride under conditions which reduce the acid number of the product to a value lower than about 25.

Heretofore non-drying, semi-drying and drying oils have been the major constituents of many film-forming vehicles used in the production of decorative and protective coating compositions. These have been treated and reacted in many ways to improve the inherent properties of the oils. In U. S. application 561,496, now Patent No. 2,465,337, filed November 1, 1944, by Miller and Sorenson there is disclosed a method of preparing ketenes from saturated and unsaturated higher aliphatic monocarboxylic acids by reacting the same with acetic anhydride. While this process produces very desirable compositions under certain conditions, the acid number of the product may be fairly high, which sometimes limits the use of the compositions containing the ketene to preparations in which non-reactive pigments are used.

It is, therefore, an object of the present invention to prepare ketene polymers of the more unsaturated fatty acids to produce products having acid numbers below about 25.

Another object is the provision of means for producing new and useful products having low acid numbers which dry satisfactorily to films possessing excellent properties.

Still another object is to slow down and modify the polymerization process described in Patent No. 2,465,337 so that the reaction of ketene formation can be carried more nearly to completion, thereby arriving at a product with a low acid number.

A still further object is the provision of means for producing new and useful polymers, which retain substantially the same degree of saturation or unsaturation as the monocarboxylic acids from which they are derived, and which in addition possess a low acid number.

Other objects will be readily apparent as the description of the invention proceeds.

These and other objects are accomplished in the present invention by a process which involves the providing of means of slowing down and modifying the polymerization reaction described in Patent No. 2,465,337 by the introduction into the reaction of a so-called holding agent of a character inert to acids or anhydrides but which acts as a solvent for the reactants and reaction product.

I have found that under certain conditions described below the introduction of holding agents inert to the action of the acid and anhydride reagents of Patent No. 2,465,337 slows down the polymerization so that the reaction of ketene formation may be carried more nearly to completion and to a lower acid number without changing, in any substantial amount, the degree of saturation or unsaturation of the monocarboxylic long chain acids employed.

I have also found that two general types of holding agents may be used to advantage, i. e. those which are volatile and may be readily removed from the polymer after the reaction is completed and those which are non-volatile and are left with the polymer.

High boiling esters, ethers or hydrocarbons belonging to either the aliphatic or aromatic series may be employed as volatile holding agents provided they are inert to acetic anhydride. These are removed after the reaction is complete by distillation at reduced pressure or by blowing with an inert gas such as carbon dioxide or nitrogen.

Examples of compounds which may be employed as volatile holding agents follow:

| | Boiling point, °C. |
|---|---|
| Dowtherm A | 250 |
| Triacetin | 259 |
| Decalin | 194 |
| Butyl tolyl ether | 229 |
| Tetralin | 207 |
| Naphthalene | 218 |
| Hexachlorbutadiene | 210–230 |
| Monochlornaphthalene | 258 |
| Kerosene | 225–275 |

Inert gums such as ester-gum, rosin esters of pentaerythritite, petroleum resins, indene-coumarone resins and vegetable or animal oils such as linseed, cotton seed, coconut, babassu, peanut, corn, soya bean, or fish oil may be used as non-volatile holding agents which are to be left with the polymer.

I prefer to use from 35% to 50% of holding agent. Less than 35% does not have sufficient holding action, and more than 50% slows the reaction below the point of efficiency.

This invention will be more fully understood from the following examples and detailed descriptions which are given by way of illustration and not limitation except insofar as defined by the appended claims. The parts are by weight unless otherwise specified. The viscosity and color designations are based on the Gardner-Holdt scale which is used in varnish and resin practice.

Example I

|  | Parts |
|---|---|
| Linseed oil acids (distilled) | 1200 |
| Kerosene fraction (B. P. 225-275° C.) | 1200 |
| Acetic anhydride (technical) | 146 |
| Acetic anhydride (technical) | 560 |

The linseed oil acids, kerosene and 146 parts of acetic anhydride are charged into a five liter, three necked flask fitted with a mechanical stirrer, a thermometer extending into the liquid, a dropping funnel which discharges above the liquid and a bead-packed column approximately 1 meter long and 25 mm. in diameter with a distilling head at the upper end. A sampling tube may be included for convenience.

The charge in the flask is stirred and heated until distillation starts at a liquid temperature of about 178° C. and a vapor temperature of 116–118° C. The acetic acid-kerosene binary is distilled out until the temperature of the liquid reaches 240–250° C. where it is maintained. A second lot of acetic anhydride is added slowly through the dropping funnel at approximately the same rate as the acetic acid distillate is removed. The reaction is continued until a sample withdrawn from the batch has a viscosity of B-C (Gardner-Holdt Std.). The amount of acetic anhydride added in the second portion may vary depending on the distillation rate and on the efficiency of the column used.

The reaction mixture is transferred to a vacuum distillation flask fitted with a mechanical stirrer, a thermometer to dip into the liquid, a short Claisen distilling head connected to a suitable condenser and a vacuum receiver. The reaction mixture is heated to 225° C. where it is maintained while the pressure is gradually reduced to 3–5 mm. This temperature and this pressure are maintained until the volatile products (kerosene, acetic acid and acetic anhydride) are removed. This usually requires about 30 minutes after the designated temperatures and pressure are obtained.

The residual viscous polymer is thinned with mineral spirits. Yield of unthinned varnish base 1122 parts.

Constants:
| | |
|---|---|
| Solids per cent | 65 |
| Color | 10+ |
| Viscosity | Q |
| Acid number | 6.5 |
| Specific gravity | 0.883 |

Drying time (no metallic drier):
| | |
|---|---|
| Dust free hours | 2½ |
| Tack free do | 8½ |

Example II

|  | Parts |
|---|---|
| Linseed oil acids (distilled) | 1750 |
| Easter gum | 605 |
| Acetic anhydride (technical) | 400 |
| Acetic anhydride (technical) | 580 |

The first three ingredients are charged into a 5 liter flask equipped as described in "Example I."

The charge is heated until melted and stirred until distillation starts. (Liquid temperature= 150° C. and vapor temperature=116–118° C.) The acetic acid fraction is drawn off slowly as the liquid temperature rises to 240–250° C. where it is held. The second acetic anhydride is added slowly at 240–250° C. at about the same rate as the acetic acid fraction is drawn off. The reaction is continued until a sample withdrawn from the melt and thinned with mineral spirits (60% melt, 40% thinner) has a viscosity of A to B. This usually requires the addition of 580 parts of acetic anhydride at 240–250° C. but this may vary.

When the desired viscosity is obtained the melt is transferred to a distillation flask as described in Example I. The melt is heated to 225–230° C. and the pressure is gradually reduced to 3–5 mm. When all of the volatile is removed the residual varnish is thinned with mineral spirits. Yield of unthinned varnish=2163 parts.

Constants:
| | |
|---|---|
| Solids per cent | 65 |
| Viscosity | L |
| Color | 9.5 |
| Acid number | 12.7 |

The final viscosity of the varnish may be increased by further heating after the volatile constituents have been removed by vacuum distillation.

Example III

|  | Parts |
|---|---|
| Linseed oil acids (distilled) | 1915 |
| Ester gum | 665 |
| Acetic anhydride (technical) | 500 |
| Acetic anhydride (technical) | 380 |

Run as in Example II up to the point where the residual acetic acid and acetic anhydride is removed. The addition of acetic anhydride is continued until a sample of melt thinned in mineral spirits (65% melt, 35% thinner) has a viscosity of C.

The column is then removed and replaced with a short distilling head attached to a condenser. The charge is stirred and blown with inert gas such as nitrogen or carbon dioxide while the temperature of the melt is raised to 265° C. It is held at 265° C. until a sample of melt thinned with mineral spirits (50% melt, 50% thinner) has a viscosity of E to F. The melt is cooled and thinned with mineral spirits. Yield of varnish solids=2248 parts.

Constants:
| | |
|---|---|
| Solids per cent | 50 |
| Viscosity | L |
| Acid number | 12.0 |
| Color | 9.0 |

Drying time (no metallic drier):
| | |
|---|---|
| Dust free hours | 2¼ |
| Tack free do | 8–9 |

Example IV

|  | Parts |
|---|---|
| Linseed oil acids (distilled) | 870 |
| Petroleum resin (Velsicol AD4) | 300 |
| Acetic anhydride (technical) | 150 |
| Acetic anhydride (technical) | 335 |

The charge is placed in a 3 liter, three necked flask equipped as described in "Example I."

The process is carried out as in Example 3. Acetic anhydride is added at 240–250° C. until a sample of melt thinned with mineral spirits (50% melt, 50% thinner) has a viscosity of A.

The column is removed and replaced with a short distilling head attached to a condenser. The mixture is stirred and heated to 240–250° C. while blowing with an inert gas. Heating is continued at 240–250° C. until a sample of the melt thinned with mineral spirits (50% melt, 50% thinner) has a viscosity of B. It is then cooled and thinned with mineral spirits. Yield of non-volatile varnish base—1036 parts.

Constants:
- Solids _____per cent__ 51
- Viscosity _____ F
- Color _____ 10+
- Acid number _____ 12.7

Drying time (no metallic driers):
- Dust free _____hours__ 1½
- Tack free _____do____ 7

Example V

| | Parts |
|---|---|
| Linseed oil acids (distilled) | 870 |
| Pentylin C (rosin esters of pentaerythritite) | 300 |
| Acetic anhydride (technical) | 200 |
| Acetic anhydride (technical) | 380 |

The procedure is as in Example 4. Acetic anhydride is added at 240–250° C. until a sample of melt thinned with mineral spirits (60% melt, 40% thinner) has a viscosity of D.

The column is removed and the mass is blown with an inert gas at 240–250° C. until a sample thinned with mineral spirits has a viscosity of D–E when thinned with an equal weight of mineral spirits. The product is cooled and thinned with mineral spirits. Yield of unthinned varnish base=1020 parts.

Constants:
- Solids _____per cent__ 50
- Viscosity _____ E
- Color _____ 8.5
- Acid number _____ 9.0

Drying time (no metallic driers):
- Dust free _____hours__ 2
- Tack free _____do____ 7

Example VI

| | Parts |
|---|---|
| Linseed oil | 1245 |
| Linseed oil acids (distilled) | 1245 |
| Acetic anhydride (technical) | 400 |
| Acetic anhydride (technical) | 387 |

The linseed oil, linseed oil acids and the first portion of the acetic anhydride are placed in a 5 liter three necked flask equipped as described in "Example I."

The contents of the flask are agitated and heated until distillation starts at a liquid temperature of 155–160° C. and a vapor temperature of 117–120° C. The acetic acid fraction is drawn off gradually at 117–120° C., and the temperature of the liquid is allowed to rise to 240–250° C. where it is maintained.

At 240–250° C. the second portion of acetic anhydride is added slowly through the dropping funnel at about the same rate at which the acetic acid fraction is distilled out. Acetic anhydride addition is continued until a sample withdrawn from the batch has a viscosity of U (Gardner-Holdt scale). The second amount of acetic anhydride designated above is usually required to arrive at the desired viscosity, but more or less may be needed depending on the efficiency of the column and on the rate of distillation.

The reaction mixture is transferred to a vacuum distillation flask as described in "Example I" and is there heated to 210–215° C. and the pressure of the flask is gradually reduced to 3–5 mm. This temperature is held for 15–20 minutes or until distillation nearly ceases. The residual polymer is cooled and poured into closed containers. Yield of polymer 2302 parts.

Constants:
- Solids _____per cent__ 100
- Acid number _____ 7.0
- Viscosity _____ X
- Color _____ 7.0
- Specific gravity _____ .940

Drying time (no metallic driers):
- Dust free _____ 3½ hours
- Tack free _____ 8 hours (slight residual tack)

Example VII

| | Parts |
|---|---|
| Linseed oil acids (distilled) | 605 |
| Dowtherm (B. P. app. 258° C.) | 600 |
| Acetic anhydride (technical) | 130 |
| Acetic anhydride (technical) | 300 |

The reaction is run in the same type of apparatus as is described in Example I. The first three ingredients are heated and stirred and acetic acid is distilled out at 117–119° C. until the batch temperature reaches 260° C. where it is held.

The second portion of acetic anhydride is added slowly through a dropping funnel at the same rate that the acetic acid is fractionated out. The reaction is continued until a sample withdrawn from the batch has a viscosity of G (Gardner-Holdt Standard).

The reaction mixture is transferred to a flask fitted for vacuum distillation which is described in Example I. The charge is heated at 225° C. and held while the pressure is gradually reduced to from 3–5 mm. It is held until no more Dowtherm and acetic anhydride distill over.

The residual polymer (yield 559 parts) is cooled and thinned with mineral spirits.

Constants:
- Solids _____per cent__ 60
- Viscosity _____ M
- Color _____ 10+
- Acid number _____ 3.2

The acid numbers reported for the products obtained in the examples were determined by carrying out the test with alcoholic caustic with the sample to be tested in solution in benzene and methanol.

The polymers resulting from the process herein described are similar to those disclosed in Patent No. 2,465,337, but they have lower acid numbers. These polymers prepared by the method of Patent No. 2,465,337, using linseed oil acids as the monocarboxylic long chain acid, have acid numbers in the range of 23 to 26, whereas the similar polymer made by the process of this invention using Dowtherm as a volatile holding agent as in Example VII has an acid number of only 3.5, and the polymer made using kerosene, as in Example I has an acid number of 6.5.

When the holding agent is a resin like ester gum, petroleum resin or rosin-pentaerythritite ester the reduction in acid number is not so marked as is the case with Dowtherm or kerosene as the holding agent. It is, however, reduced considerably. In Example II, for instance, the acid number of the reaction product containing the ester gum as a non-volatile admixture with the linseed oil acid ketene polymer is 12.7. This would correspond to an acid number of 17.8 on the linseed oil acid polymer itself assuming the acid number of the ester gum to be zero. The ester-gum holding agent in this case had, therefore, lowered the acid number of the polymer itself from 23–26 to 17.8. A similar action in lowering the acid number is exhibited in Example III where the calculated acid number of the polymer itself is 16.8; in Example IV with petroleum resin where the calculated figure is 17.2; and in Example V with rosin esters of pentaerythritite where the calculated acid number of the polymer is 12.2.

Where linseed oil is used as the holding agent, the lowering of the acid number is likewise not as marked as where Dowtherm or kerosene is used but it is also lowered to a considerable extent. In Example VI where linseed oil is used as the holding agent the calculated acid number of the polymer, as such, is 14.0 as compared with 23–26 for the polymer prepared without any holding agent.

Reaction mixtures prepared as outlined in Examples II, III, IV and V from drying oil acids, and using non-volatile inert resins which remain in the reaction mixture as holding agents, may be used directly as varnishes. Polymers prepared by using volatile kerosene or non-volatile linseed oil as holding agents may be used as ingredients in either clear or pigmented coating materials.

In general, films made from these polymers, whether the holding agent is volatile and removed or whether it is non-volatile and remains in the reaction mixture, will dry tack-free without metallic driers, but these may be added when a greater speed of drying is desirable.

Because of the low acid number of the polymers of this invention, they are particularly adapted for use with reactive pigments such as zinc oxide, red lead, basic zinc chromate and the like.

It is to be understood that the examples herein are not given as limitations but merely as illustrations. Both saturated and unsaturated long chain fatty acids may be used in place of the linseed oil acids of the examples; both saturated and unsaturated fats or oils may be used in place of the linseed oil as a holding agent; many hydrocarbons, aliphatic and aromatic may be used in place of the kerosene; and many other inert resins other than ester gum, rosin ester of pentaerythritite, or petroleum resins, may be employed as holding agents.

It is apparent that many widely different embodiments of this invention may be made without departing from the spirit and scope thereof, and therefore, it is not intended to be limited except as indicated in the appended claims.

I claim:

1. The process of preparing ketenes having a low acid number which comprises heating about 1200 parts each of linseed oil acid and kerosene together with about 146 parts of acetic anhydride in a distilling flask at a temperature of about 178° C., continuing the heating until the liquid reaches about 250° C., adding 560 parts of acetic anhydride slowly at approximately the same rate at which the acetic acid distillate is removed, continuing the heating until the viscosity of the reaction mixture is B–C on the Gardner-Holdt Scale, transferring the reaction mixture to a vacuum condenser and heating the same at about 225° C. at a pressure of about 3–5 mm. until volatile products have been removed.

2. The process of preparing ketenes which comprises heating a long chain monocarboxylic fatty acid with acetic anhydride to a temperature within the range of 200° C. to 260° C. and, while maintaining this temperature, simultaneously adding acetic anhydride at substantially the same rate as the chemical equivalent of acetic acid is withdrawn; and limiting the acid number of the ketenes so produced to a value below 25 by having present during the reaction from 35% to 50%, based on the weight of the reaction mixture, of an organic material which is a solvent for the said reaction mixture within the said temperature range and which is substantially non-reactive with the said fatty acid, acetic acid and acetic anhydride within the said range and which boils above 190° C.

3. The process of claim 2 in which the organic material is a liquid boiling between 190° C. and 290° C.

4. The process of claim 2 in which the organic material is a hydrocarbon boiling between 190° C. and 290° C.

5. The process of claim 2 in which the organic material is a resin.

6. The process of claim 2 in which the organic material is a vegetable oil.

7. The process of claim 2 in which the organic material is kerosene.

8. The process of claim 2 in which the organic material is a vegetable oil having drying properties.

BEN E. SORENSON.

REFERENCES CITED

The following references are of record in the file of this patent:

UNITED STATES PATENTS

| Number | Name | Date |
|---|---|---|
| 1,926,642 | Young et al. | Sept. 12, 1933 |
| 1,942,110 | Law | Jan. 2, 1934 |
| 2,019,983 | Law | Nov. 5, 1935 |
| 2,246,599 | Oxley et al. | June 24, 1941 |
| 2,383,863 | Huester | Aug. 28, 1945 |